(12) United States Patent
Mölter et al.

(10) Patent No.: US 10,996,144 B2
(45) Date of Patent: May 4, 2021

(54) PROCESS AND DEVICE FOR DILUTING AN AEROSOL

(71) Applicant: Palas GmbH Partikel—und Lasermeßtechnik, Karlsruhe (DE)

(72) Inventors: Leander Mölter, Wörth am Rhein (DE); Ralf Notheis, Philippsburg (DE); Joachim Roman, Karlsruhe (DE); Martin Schmidt, Karlsruhe (DE)

(73) Assignee: Palas GmbH Partikel- und Lasermeßtechnik, Karlsruhe (DE)

( * ) Notice: Subject to any disclaimer, the term of this patent is extended or adjusted under 35 U.S.C. 154(b) by 279 days.

(21) Appl. No.: 16/204,246

(22) Filed: Nov. 29, 2018

(65) Prior Publication Data
US 2019/0162636 A1 May 30, 2019

(30) Foreign Application Priority Data

Nov. 30, 2017 (DE) .................... 10 2017 011 074.3

(51) Int. Cl.
*G01N 15/06* (2006.01)
*G01N 1/22* (2006.01)
(Continued)

(52) U.S. Cl.
CPC ........... *G01N 1/2252* (2013.01); *B01F 3/026* (2013.01); *B01F 3/04014* (2013.01);
(Continued)

(58) Field of Classification Search
CPC ... G01N 1/2252; B01F 3/026; B01F 3/04014; B01F 3/04992; B01F 5/0471; B01F 5/048; B01F 5/102
See application file for complete search history.

(56) References Cited

U.S. PATENT DOCUMENTS 3,854,321 A * 12/1974 Dahneke ............ G01N 15/1434
73/28.01
6,585,803 B1 * 7/2003 Chang .................... B03C 3/155
55/525
(Continued)

FOREIGN PATENT DOCUMENTS

DE          42 18 690 A1    12/1993
DE    10 2014 223 815 A1     5/2016
(Continued)

OTHER PUBLICATIONS

VDI Guideline VDI 3491, Sheet 15, No. 4, p. 4.

*Primary Examiner* — Jamel E Williams
(74) *Attorney, Agent, or Firm* — McGlew and Tuttle, P.C.

(57) ABSTRACT

A process dilutes an aerosol by feeding an input aerosol through an inlet pipe surrounded by an annular space to a first mixing stage. An output aerosol leaves purified via an outlet as a particle-free clean gas. The particle-free clean gas is fed to the annular space upstream of the outlet and is mixed with the aerosol. A mixing stage includes an inlet pipe feeding aerosol as inlet aerosol. A downstream purification device purifies outlet aerosol leaving the mixing stage via an outlet pipe to form the particle-free clean gas. A mass flow controller and a pump suction off the outlet aerosol from the outlet pipe. A return line, for the clean gas, leads upstream into the annular space.

24 Claims, 3 Drawing Sheets

(51) Int. Cl.
*B01F 3/02* (2006.01)
*G01N 1/38* (2006.01)
*B01F 5/10* (2006.01)
*B01F 5/04* (2006.01)
*B01F 3/04* (2006.01)
*G01N 15/00* (2006.01)

(52) U.S. Cl.
CPC .......... *B01F 3/04992* (2013.01); *B01F 5/048* (2013.01); *B01F 5/0471* (2013.01); *B01F 5/102* (2013.01); *G01N 1/2205* (2013.01); *G01N 1/2247* (2013.01); *G01N 1/38* (2013.01); *G01N 15/06* (2013.01); *G01N 2001/2255* (2013.01); *G01N 2001/2264* (2013.01); *G01N 2015/0046* (2013.01); *G01N 2015/0693* (2013.01)

(56) References Cited

U.S. PATENT DOCUMENTS

| | | | | |
|---|---|---|---|---|
| 7,363,828 | B2 * | 4/2008 | Liu | G01N 1/2252 356/436 |
| 8,869,593 | B2 * | 10/2014 | Gorbunov | G01N 15/065 73/28.01 |
| 10,732,082 | B2 * | 8/2020 | Johnson | G01N 15/06 |
| 2016/0139013 | A1 * | 5/2016 | Gorbunov | G01N 1/2247 73/28.01 |
| 2019/0168955 | A1 * | 6/2019 | Molter | B01F 5/102 |
| 2019/0212235 | A1 * | 7/2019 | Johnson | G01N 1/38 |

FOREIGN PATENT DOCUMENTS

| | | | | |
|---|---|---|---|---|
| EP | 1757921 | A2 * | 2/2007 | ........... G01N 15/065 |
| EP | 1757921 | A2 | 2/2007 | |
| GB | 2259982 | A * | 3/1993 | ........... G01N 1/2202 |
| GB | 2259982 | A | 3/1993 | |

* cited by examiner

PROCESS AND DEVICE FOR DILUTING AN AEROSOL

CROSS REFERENCE TO RELATED APPLICATIONS

This application claims the benefit of priority under 35 U.S.C. § 119 of German Application 10 2017 011 074.3, filed Nov. 30, 2017, the entire contents of which are incorporated herein by reference.

TECHNICAL FIELD

The present invention pertains to a process and to a device for diluting an aerosol.

BACKGROUND

An aerosol is a particle-carrying gas or gas mixture, especially air. Such aerosols must be tested for a great variety of reasons.

Only one particle may be present at any one time in the measured volume especially in the case of measurement methods used for testing, with which the number of particles flowing through a measured volume per unit of time is detected. This is not ensured in case of highly concentrated aerosols. If two or more particles are present simultaneously in a measured volume, this leads to coincidence errors. These are a counting error, on the one hand, because the number of particles detected is too low, since, for example, two or more particles are detected as only one particle. Moreover, there arises a size error, because a plurality of particles are seen as only one particle, and this particle is detected as an excessively large particle if two or more particles flowing offset next to each other through the measured volume darken a larger area than every individual particle would.

Therefore, highly concentrated aerosols are to be diluted for this reason. A reduction of the probability of such errors or even a practically complete elimination of such errors can be achieved by the aerosol being diluted by particle-free gas. An external gas or gas mixture, especially also clean air, may be added, in principle, for this purpose. It is disadvantageous that this gas does not have the same parameters as the carrier gas or carrier gas mixture of the aerosol, having, for example, a different moisture content and/or temperature, as a result of which the measurement results may be distorted.

It is known, for example, from the VDI Guideline VDI 3491, Sheet 15, No. 4, p. 4, that the aerosol flowing in as an inlet aerosol can be split into two aerosol flows and, on the one hand, the larger portion can be pumped through a filter, which purifies the aerosol in this branch and generates a clean gas or clean gas mixture, especially also particle-free air, and, on the other hand, a smaller portion of the aerosol can be sent through a capillary—with an internal diameter of 1 mm and with a length of 150 mm—and the two flows can again be merged downstream of the filter and the pump, on the one hand, and of the capillary, on the other hand, and the mixed flow can be fed to the sensor device.

The drawback of this procedure is, in particular, that particles, especially liquid particles, will be deposited on the wall of the capillary because of the small diameter of the capillary, as a consequence of which the composition of the aerosol leaving the capillary will change and such particles may thus also distort the measurement result. Continuous monitoring of the state of the capillary is also necessary for this reason.

SUMMARY OF THE INVENTION

A basic object of the present invention is therefore to provide a process and a device that permit especially a more accurate setting of the mixing ratio, which is necessary for inferring the particle concentration and the particle size distribution in the inlet aerosol.

The above object is accomplished according to the present invention with a process of the type described in the introduction, which is characterized in that the aerosol is fed as an inlet aerosol into an annular space in a first process step, that a fixed portion of the outlet aerosol leaving the first annular space is branched off for purification downstream of the first annular space and is fed again upstream to the first annular space as a particle-free clean gas, that a portion of the outlet aerosol of the first annular space is fed to a second mixing stage, and that outlet aerosol of the second mixing stage is purified in a second process step to form a particle-free clean gas, and this clean gas is fed again to the second mixing stage upstream of the outlet of the second mixing stage.

Furthermore, a device of this class is proposed for accomplishing the object mentioned for diluting aerosol, which device is characterized by at least one mixing stage, with an inlet pipe feeding aerosol as an inlet aerosol through an outlet pipe, by a purification device adjoining downstream for purifying outlet aerosol leaving the mixing stage via the outlet pipe to form a particle-free clean gas, by a mass flow controller and by a pump for suctioning the outlet aerosol from the outlet pipe, as well as by a return line for the clean gas, leading upstream into the mixing stage. The inlet aerosol fed is thus mixed with this clean gas fed into the mixing chamber to form a diluted aerosol.

The term clean gas in the text designates a gas freed from liquid or solid particles, such clean gas consisting of a gas component or a gas mixture consisting of a plurality of individual gases, especially particle-free air. The annular space surrounds the inlet pipe and is a space with an annular cross-section. Most preferred are an inlet pipe for the aerosol leading to a measuring device with a measuring outlet arranged in alignment with a common axis. The aerosol to be measured flows along the common axis to the inlet pipe and the measuring outlet.

According to preferred variants of the process, provisions are made for the clean gas to be fed to the inlet aerosol at a volume flow ratio preset at a fixed value, wherein especially the ratio of the volume flow of the inlet aerosol and of the clean gas fed to this is determined by a mass flow controller (MFC).

Moreover, provisions may be made in a preferred variant for the inlet aerosol to be fed into the mixing space through a feed pipe, which has a smaller cross section than the annular space and for the clean gas fed to the annular space being introduced into the annular space above an outlet end of the feed pipe, as a result of which intensive mixing of inlet aerosol and clean gas is brought about.

A preferred embodiment of the process according to the present invention is characterized in that the outlet aerosol is sent through an optical sensor device prior to the purification (FIG. 1), and especially excess clean gas is removed as waste air.

Provisions are made in a preferred alternative embodiment of the process for only a fixed portion of the outlet aerosol to be branched off for purification downstream of the annular space and to be fed again as particle-free clean gas upstream of the mixing space, wherein especially the outlet aerosol that was not branched off is sent through an optical sensor device (FIG. 2).

Furthermore, provisions may be made in a preferred variant for a fixed portion of the outlet aerosol leaving a first mixing stage being branched off for purification as an intermediate aerosol in a two-stage process downstream of a first mixing stage and being fed again as particle-free clean gas upstream of the mixing stage, for the portion of this intermediate aerosol that was not branched off to be sent through a second mixing stage and an optical sensor device following this mixing stage, after which, purified, a portion of the clean gas is removed—again—as waste air, and another portion of the clean gas purified in this second stage is again fed to this second stage above the sensor device for joining with the intermediate aerosol fed from the first mixing stage.

In a concrete embodiment, this process accordingly makes provisions for the aerosol to be fed as inlet aerosol to a first annular space in a first process step, for a fixed portion of the outlet aerosol being discharged from the first annular space to be branched off for purification downstream of the first annular space and to be fed again upstream as particle-free clean gas to the first annular space, for a portion of the outlet aerosol of the first annular space to be fed to a second mixing stage, and for outlet aerosol of the second mixing stage to be purified in a second process step to form a particle-free clean gas and for this clean gas of the second mixing stage to be fed again upstream of the outlet of the second mixing stage.

This process may be perfected by the outlet aerosol of the second mixing stage being sent through an optical sensor device prior to the purification, while especially excess clean gas is removed as waste air.

In a preferred embodiment of the device according to the present invention, an end area of the inlet pipe is surrounded by an annular space, into which the return line opens.

To carry out the above-described process according to the present invention, the device according to the present invention preferably provides, in a variant, for the inlet pipe to have a smaller cross section than the mixing space and for the inlet of the return line to be arranged upstream of the outlet end of the mixing space. Furthermore, provisions may be made in a preferred embodiment of the device for the outlet aerosol to be sent through a sensor device prior to the purification, wherein the mass flow controller is arranged especially in a branch of the return line for branching off a certain portion of the clean gas as waste air. As an alternative or in combination herewith, the device may be configured such that a lateral outlet opening is arranged downstream of the annular space for branching off a certain portion of the outlet aerosol, the mass flow controller being provided especially in the return line.

To carry out the above-mentioned two-stage process, provisions are made in another embodiment for the first mixing device just described above with the first mixing stage to be adjoined by another mixing device with a second mixing stage, downstream of which the sensor device is arranged, and which is followed, in turn, by a return line for returning a portion of the aerosol mixture passing through the sensor device as clean gas into the inlet area of the second mixing stage, wherein a mass flow controller is arranged in a branch of the return line for branching off a certain portion of the clean gas as waste air.

In a concrete embodiment, this device is characterized by at least one first mixing device with an inlet pipe leading to this mixing device for the aerosol as an inlet aerosol, with an outlet located downstream of the inlet pipe to a first return line with a first purification device and with a first mass flow controller and with a first pump, wherein the first return line opens upstream of the orifice of the inlet pipe in a first annular space surrounding an end area of the inlet pipe, with a transition pipe from the first mixing stage to a second mixing stage, with an outlet pipe and with a sensor device arranged downstream thereof outlet pipe, with a second purification device and with a second return line having a second mass flow controller and with a pump, wherein especially a third mass flow controller is arranged in a branch of the second return line for branching off a certain portion of the particle-free gas from the second return line, which gas was purified by the second purification device.

While the desired mass flow is maintained at a constant value by a mass flow controller (MFC) in an extremely preferred embodiment of the process and pumps are used only to maintain the mass flow per se and the device according to the present invention preferably has these components, provisions may, in principle, also be made for the mass flow to be measured by a flow sensor as an ACTUAL value and for the desired SET point of the mass flow to be controlled (set) by controlling a pump of the inlet pipe and the outlet pipe.

The internal diameters are greater than $0.3 \times \sqrt{y}$, wherein y is the length of the inlet pipe, but they equal at least 4 mm. The length of the pipe is preferably practically 60 mm to 80 mm. The internal diameter of the mixing chamber does not preferably exceed twice the pipe diameter, especially equaling about twice the pipe diameter.

Further advantages and features of the present invention appear from the claims and from the following description, in which exemplary embodiments of the present invention are explained in detail with reference to the drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Figure 1:
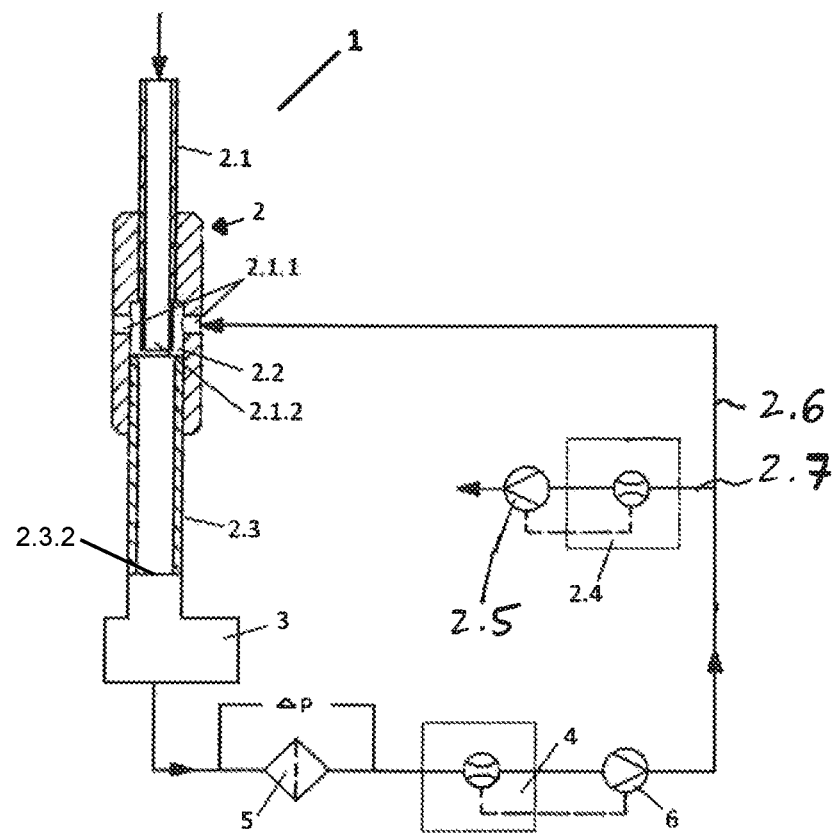
FIG. 1 is a sectional schematic view showing a first embodiment of a device according to the present invention for diluting aerosol for carrying out the process according to the present invention.

The inventive device 1 of FIG. 1 has a mixing device with a mixing stage 2, with an inlet pipe 2.1, a surrounding annular space 2.2 and a outlet pipe 2.3 with an inlet opening 2.3.1. In the illustrated embodiment the outlet pipe is 2.3, via its outlet 2.3.2, called the measuring outlet, is directly connected with an optical sensor device 3, which is known per se, such as an aerosol spectrometer, for determining the particles of an aerosol with respect to the number per unit time by a measuring volume of the associated particles and their size.

Referring to the drawings, the device 1 according to the present invention shown in FIG. 1 has a mixing device with a mixing stage 2, with an inlet pipe 2.1, an annular space 2.2 surrounding this inlet pipe 2.1, and an outlet pipe 2.3 with an inlet opening 2.3.1. The outlet pipe 2.3, via an outlet pipe outlet 2.3.2, a measuring outlet, is directly connected in the exemplary embodiment shown to an optical sensor device 3, which optical sensor device 3 is known per se, such as an aerosol spectrometer, for determining the particles of an aerosol in terms of the number of particles passing through a measured volume of the device 3 per unit of time and the size thereof. The inlet pipe 2.1 and the outlet pipe 2.3 are aligned, so have a common axis A, which axis A is also the axis of the inlet of the optical sensor device. This also applies to the embodiments of FIGS. 2 and 3.

The outlet aerosol leaving the sensor device 3 via a return line 2.6 is suctioned off via a mass flow controller (MFC) 4 by a pump 6 with a preset throughput of, for example, 5 L/min via a purification device 5 in the form of a filter. The purification device 5 generates a clean, particle-free gas or gas mixture (hereinafter called only clean gas) from the outlet aerosol suctioned off from the sensor device 3; if the carrier gas of the inlet aerosol entering the inlet pipe 2.1 is air, clean air is generated by the filter.

This clean gas is fed again at a preset percentage, for example, 90%, i.e., at a rate of 4.5 L/min in case of the above-mentioned suction rate, equaling 5 L/min here, upstream of the outlet pipe 2.3 of the mixing device 2. A branch line 2.7 of a branch pump 2.5 and of a mass flow controller (MFC), by means of which branch line the desired remaining percentage of 10% or 0.5 L/min here, is branched off as waste air.

In particular, the purification device 5 may also be arranged downstream of the branch of the line 2.7 from the return line 2.6, especially if the particles of the aerosol are harmless.

The inlet pipe 2.1 extends with its pipe end into the annular space 2.2, which has a larger diameter than the diameter of the inlet pipe 2.1 or the pipe thereof. The returned clean gas is fed to the annular space 2.2 via a lateral inlet 2.1.1 or via up to four lateral inlets distributed equally over a circumference (which are then connected via an outer pipeline) in front of the outlet 2.1.2 of the pipe 2.1. Inlet aerosol and clean gas enter together the inlet opening of the outlet pipe or outlet 2.3, in which opening they are then mixed and the aerosol is diluted to form a diluted outlet aerosol.

Intensive mixing of the concentrated inlet aerosol with the clean gas fed laterally via the inlet 2.1.1 is achieved due to this configuration.

Highly concentrated inlet aerosol is fed to the mixing stage 2 with a preset volume flow via the inlet pipe 2.1. This inlet aerosol is mixed intensively with the controlled, preset volume flow of the clean gas having the same composition as the gas of the inlet aerosol based on the structural configuration of the mixing device 2.2. After a start-up phase, the inlet aerosol is diluted in the measuring operation to form a diluted outlet aerosol leaving the pipe end of the outlet pipe 2.3, which said outlet aerosol is defined on the basis of the given mixing ratio, here at a ratio of 1:10, and which can be measured in the sensor device 3 during the measuring phase in the usual manner, i.e., especially in terms of particle throughput per unit of time and the particle size. The diluted aerosol leaving the sensor device 3 is suctioned off through the filter via the mass flow controller 4 and the pump 6, is purified in the process to obtain a clean gas mixture and is fed again to the mixing device 2 with the described percentage of 90% or 4.5 L/min in the likewise described manner. In a concrete embodiment, the mass flow of the inlet aerosol equals, for example, $V_a$=0.5 L/min, and the mass flow of the diluted aerosol flowing through the measuring device in the measuring operation during a start-up phase equals Vv=5 L/min and that of the added clean air (clean gas) equals $V_r$=4.5 L/min, while the waste air is released into the open air at a rate of 0.5 L/min.

Dilution of a concentrated aerosol in respect to the particles contained in it with the same gas or gas mixture, especially air, which is present in the concentrated inlet aerosol, i.e., especially concerning the gas composition, the gas temperature and the moisture content in the gas, is achieved by the device according to the present invention and the described process according to the present invention.

Figure 2:
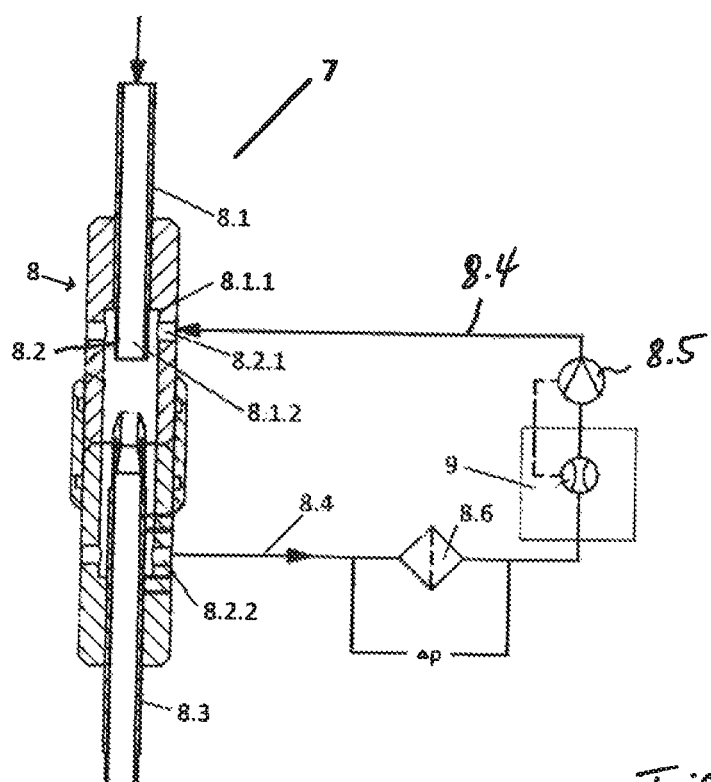
FIG. 2 is a sectional schematic view showing a second embodiment of the device according to the present invention.

FIG. 2 shows a variant of a device 7 according to the present invention. This is configured, in principle, in the same manner as the device 1 described in reference to the device 1 described in FIG. 1. The device has a mixing device 8, with an inlet pipe 8.1 with a smaller diameter compared to a surrounding annular space 8.2. An outlet pipe 8.3 is provided to a sensor device (not shown) corresponding to the sensor device 3 at a spaced location from the pipe end 8.1.1. The outlet pipe 8.3 likewise has a smaller cross section than the area of the annular space 8.2 surrounding it. A lateral outlet 8.2.2 leads from this surrounding annular space 8.2 to a return line 8.4, in which a purification device 8.6, a pump 8.7 and a mass flow controller 9 are arranged.

The procedure is the same as that described in the embodiment according to FIG. 1 with the differences described below.

A desired percentage of the aerosol flowing through the annular space 8.2, which percentage is preset at a fixed value, equaling, for example, 90% or 4.5 L/min here, is branched off from the annular space 8.2 via the outlet 8.2.2 and is purified to form a particle-free clean gas. The suctioning is carried out by the pump 9 via a mass flow controller 9, by which the aforementioned percentage or the preset flow volume is set. This clean gas is then fed via the inlet 8.2.1 located upstream of the outlet 8.2.2 to the annular space 8.2 and is mixed with the inlet aerosol.

Intensive mixing of the inlet aerosol entering through the inlet line 8.1 with the clean gas fed via the lateral inlet 8.2.1, especially air (if the carrier gas of the inlet aerosol is air), takes place, here especially in the intermediate space of the annular space 8.2 between the outlet end of the inlet pipe 8.1 and the inlet opening of the outlet pipe 8.3. Dilution takes place in this manner at a ratio of 1:10.

The percentage of the diluted aerosol, which is flowing through the following mixing space with a mass flow volume of 5 L/min here, and which is branched off via the outlet 8.2.2, flows as diluted outlet aerosol through the outlet pipe 8.3 and can be fed to a sensor device 3, as in the embodiment shown in FIG. 1.

Figure 3:
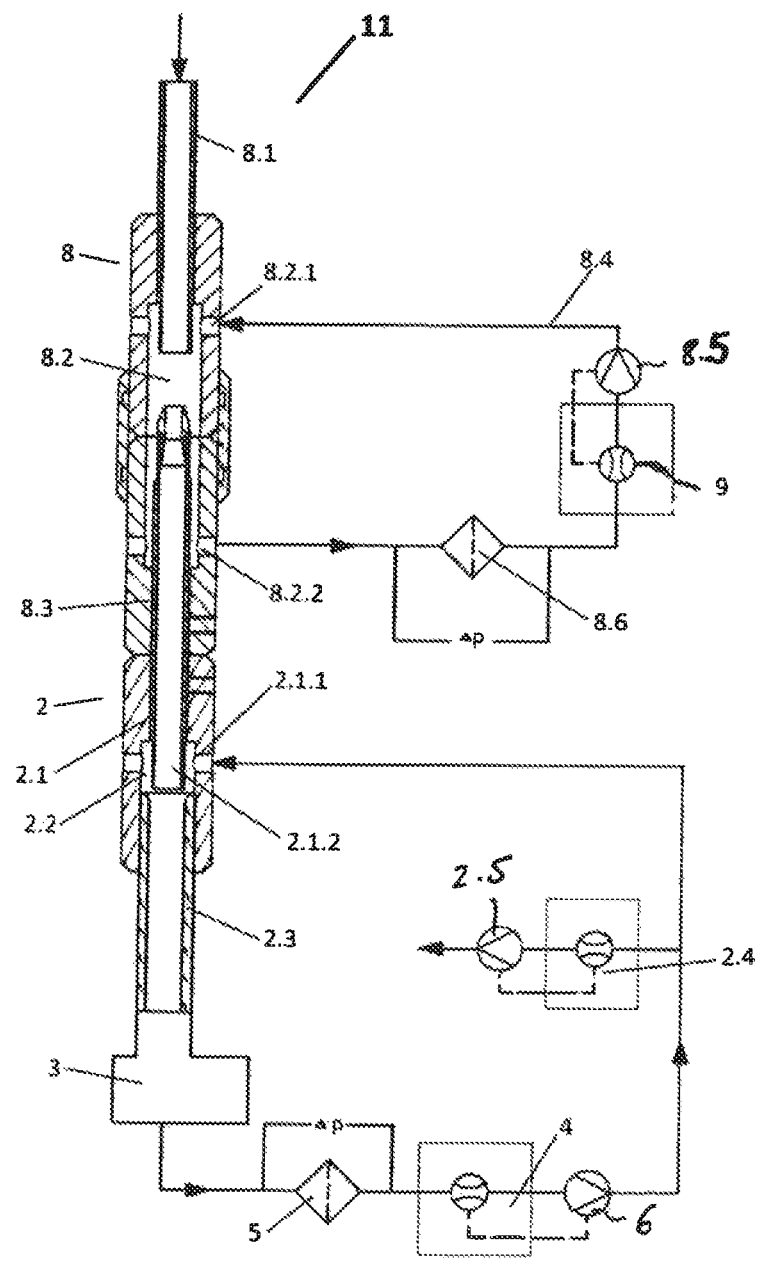
FIG. 3 is a sectional schematic view showing a third embodiment of the device according to the present invention with cascaded diluting devices.

The embodiment according to FIG. 3 is a cascade of the mixing devices according to the embodiments shown in FIGS. 2 and 1. The configuration of the mixing device with the mixing stage 8 according to FIG. 2 is arranged upstream of the mixing device with the mixing stage 2 according to FIG. 1. A potentiated dilution of the inlet aerosol entering through the inlet pipe 8.1 can be achieved by the embodiment according to FIG. 3. If, as described in reference to FIGS. 1 and 2, each of the mixing devices 8, 2 brings about a dilution at a ratio of 10:1 in the embodiment according to FIG. 3, a dilution of 100:1 is brought about by the cascading of the embodiment according to FIG. 3.

Reference is made to the explanations given above for FIGS. 1 and 2 for the embodiment of the two individual mixing devices arranged one after another. In the embodiment according to FIG. 3, the outlet pipe 8.3 of the mixing stage 8 forms at the same time the inlet pipe 8.1 of the partial mixing device 2.

Dilution of the inlet aerosol takes place first in the mixing stage 8 by the aerosol being suctioned off via the outlet 8.2.2, by the purification via the purification device 8.6 and via the return of the particle-free clean gas thus purified via the inlet 8.2.1, which return is controlled via the mass flow controller, and by mixing this clean gas with the inlet aerosol entering via the pipe 8.1. This diluted aerosol (diluted, for example, by a factor of 10:1, as was described with reference to FIG. 2), is sent via the intermediate pipe 8.3, 2.1 into the mixing device 2. The diluted aerosol passes through the sensor device 3, is purified further via the purification device 5 to form a particle-free clean gas, and the gas is suctioned off via the mass flow controller. A preset quantity is branched off, as was described above with reference to FIG. 1, from the clean gas thus purified, while the preset, fixed remainder of the clean gas (here 90% or 4.5 L/min) is fed to the annular space 2.2 of the mixing device 2 via the inlet 2.1.2, and, as was indicated, the further dilution of 10:1 is brought about there, so that an overall dilution of the outlet aerosol flowing through the sensor device 3 at a ratio of 100:1 is brought about.

While specific embodiments of the invention have been shown and described in detail to illustrate the application of the principles of the invention, it will be understood that the invention may be embodied otherwise without departing from such principles.

What is claimed is:

1. A process for diluting an aerosol, the process comprising the steps of:
    feeding aerosol as inlet aerosol through an inlet pipe surrounded by an annular space to a first mixing stage;
    purifying outlet aerosol leaving via an outlet to form a particle-free clean gas;
    feeding the particle-free clean gas to the annular space upstream of the outlet;
    mixing the fed particle-free clean gas with the inlet aerosol;
    feeding a portion of the outlet aerosol to a second mixing stage;
    purifying outlet aerosol of the second mixing stage to form second mixing stage particle-free clean gas; and
    feeding second mixing stage particle-free clean gas to an annular space upstream of an outlet of the second mixing stage, wherein the outlet aerosol of the second mixing stage is sent through an optical sensor device before purification.

2. A process in accordance with claim 1, wherein the clean gas is fed to the inlet aerosol at a volume flow ratio preset at a fixed value.

3. A process in accordance with claim 1, wherein a ratio of a volume flow of the inlet aerosol to the clean gas fed to same is determined by a mass flow controller.

4. A process in accordance with claim 1, wherein:
    the inlet aerosol is fed into the mixing space through a feed pipe, which has a smaller diameter than the annular space; and
    the clean gas fed to the annular space is introduced into the annular space above an outlet end of the feed pipe.

5. A process in accordance with claim 1, wherein the outlet aerosol is sent through an optical sensor device before purification.

6. A process in accordance with claim 5, wherein excess clean gas is removed as waste air.

7. A process in accordance with claim 1, wherein only a fixed portion of the outlet aerosol is branched off for purification downstream of the annular space and is fed again as particle-free clean gas upstream of the mixing space.

8. A process in accordance with claim 7, wherein the outlet aerosol that was not branched off is sent through an optical sensor device.

9. A process in accordance with claim 7, wherein the outlet aerosol that was not branched off is fed to a next, additional mixing stage and further dilution is carried out at the additional mixing stage comprising:
    feeding the outlet aerosol that was not branched off as additional mixing stage inlet aerosol through an additional stage inlet pipe surrounded by an additional mixing stage annular space to the additional mixing stage;
    purifying the additional mixing stage outlet aerosol leaving via an additional mixing stage outlet to form additional particle-free clean gas;
    feeding the additional particle-free clean gas to the annular space upstream of the additional mixing stage outlet; and
    mixing the fed additional particle-free clean gas with the additional mixing stage inlet aerosol.

10. A process in accordance with claim 1, wherein excess clean gas is removed as waste air.

11. A process in accordance with claim 1, wherein excess clean gas is removed as exhaust air and outlet aerosol that was not branched off is sensed by an optical sensor device.

12. A process in accordance with claim 11, wherein the optical sensor device comprises an aerosol spectrometer and aerosol spectrometry is performed.

13. A process in accordance with claim 11, wherein the aerosol to be measured flows along an axis from the inlet pipe through an outlet to the optical sensor device.

14. A device for diluting an aerosol, the device comprising:
    at least one mixing stage comprising an annular space;
    an inlet pipe feeding aerosol as inlet aerosol to the mixing stage;
    an outlet pipe feeding outlet aerosol out of the mixing stage;
    a purification device adjoining the outlet pipe downstream of the mixing stage for purifying outlet aerosol leaving the mixing stage via the outlet pipe to form a clean gas comprising a particle-free aerosol;
    a pump for suctioning the outlet aerosol from the outlet pipe;
    a return line leading upstream from the purification device into the annular space for carrying the clean gas;
    a mass flow controller; and
    an aerosol-flow optical measuring device downstream of the outlet pipe, wherein the aerosol-flow optical measuring device comprises an aerosol spectrometer.

15. A device in accordance with claim 14, wherein an end area of the inlet pipe is surrounded by the annular space, into which the return line opens.

16. A device in accordance with claim 14, wherein:
    the inlet pipe has a smaller cross section than the annular space; and an inlet of the return line is arranged upstream of an outlet end of the inlet pipe.

17. A device in accordance with claim 14, further comprising a sensor device, wherein the outlet aerosol is sent through the sensor device prior to purification.

18. A device in accordance with claim 14, wherein the mass flow controller is arranged in a branch of the return line for branching off a certain portion of the clean gas as waste air.

19. A device in accordance with claim 14, wherein a lateral outlet opening is arranged downstream of the annular space for branching off a certain portion of the outlet aerosol.

20. A device in accordance with claim 18, wherein the mass flow controller is provided in the return line.

21. A device in accordance with claim 14, further comprising a sensor device, wherein the outlet aerosol is sent through the sensor device prior to purification, wherein:
- a certain portion of the clean gas is branched off as waste air;
- the sensor device is arranged downstream of the branch off of the waste air.

22. A device in accordance with claim 14, wherein the mixing stage is a second mixing stage, the purification device is a second purification device, the return line is a second return line, the mass flow controller is a second mass flow controller and the pump is a second pump and further comprising:
- another mixing stage as a first mixing stage comprising a first annular space;
- a first inlet pipe leading to the first annular space for aerosol as inlet aerosol;
- a first outlet located downstream of the first inlet pipe;
- a first return line;
- a first purification device;
- a first mass flow controller; and
- a first pump, wherein the first return line opens upstream of an opening of the first inlet pipe into the first annular space and the first annular space surrounds an end area of the opening of the first inlet pipe;
- a transition pipe from the first mixing stage to the second mixing stage;
- a sensor device, wherein the outlet pipe and the sensor device are arranged downstream of transition pipe.

23. A device in accordance with claim 21, further comprising a second return line branch and another mass flow controller arranged in the second return line branch for branching off a certain portion of the particle-free gas purified by the second purification device from the second return line.

24. A device according to claim 14, further comprising a sensor device, wherein an inlet pipe to the sensor device and the outlet pipe are aligned.

* * * * *